United States Patent
Tang et al.

(10) Patent No.: US 9,672,053 B2
(45) Date of Patent: Jun. 6, 2017

(54) SERVICE REQUEST PROCESSING (71) Applicant: VMware, Inc., Palo Alto, CA (US)

(72) Inventors: Mingjun Tang, Shanghai (CN); Lei Zhai, Shanghai (CN)

(73) Assignee: VMware, Inc., Palo Alto, CA (US)

( * ) Notice: Subject to any disclaimer, the term of this patent is extended or adjusted under 35 U.S.C. 154(b) by 224 days.

(21) Appl. No.: 14/279,951

(22) Filed: May 16, 2014

(65) Prior Publication Data
US 2014/0344340 A1 Nov. 20, 2014

Related U.S. Application Data (60) Provisional application No. 61/823,914, filed on May 16, 2013.

(51) Int. Cl.
H04L 29/08 (2006.01)
G06F 9/455 (2006.01)
(Continued)

(52) U.S. Cl.
CPC .......... *G06F 9/455* (2013.01); *G06F 9/44536* (2013.01); *G06F 9/45533* (2013.01); *G06F 9/45558* (2013.01); *G06F 9/50* (2013.01); *G06F 9/5005* (2013.01); *G06F 9/5011* (2013.01); *G06F 9/5027* (2013.01); *G06F 9/5061* (2013.01); *G06F 9/5072* (2013.01); *G06F 9/5083* (2013.01); *G06F 9/5088* (2013.01); *G06F 9/542* (2013.01); *G06F 17/30312* (2013.01); *H04L 67/2823* (2013.01); *H04L 67/2895* (2013.01); *G06F 2009/4557* (2013.01);
(Continued)

(58) Field of Classification Search
CPC .. G06F 9/44536; G06F 9/45533; G06F 9/542; G06F 17/30312; G06F 9/455; H04L 67/2823; H04L 67/2895; H04W 4/18
See application file for complete search history.

(56) References Cited

U.S. PATENT DOCUMENTS 5,615,326 A 3/1997 Orton et al.
7,370,164 B1 5/2008 Nagarkar et al.
(Continued)

OTHER PUBLICATIONS

"VMware vFabric Data Director Administrator and User Guide", vFabric Data Director, 2012, Version1.0, VMware, Inc. Also available at <URL: http://pubs.vmware.com/datadirector/topic/com.vmware.ICbase/PDF/vfabric-data-director-10-administration-guide.pdf>.
(Continued)

*Primary Examiner* — Dustin Nguyen
*Assistant Examiner* — Juan C Turriate Gastulo (57) ABSTRACT

An example method to perform service request processing may comprise receiving, from a client device, a request associated with a first version of a service, the service being accessible via the server. The method may further comprise, in response to determination that version conversion from the first version to a second version of the service is required, converting the request to be compatible with the second version of the service and processing the converted request to generate a response associated with the second version. In this case, the method may further comprise converting the response to be compatible with the first version of the service; and sending, to the client device, the converted response that is compatible with the first version.

23 Claims, 7 Drawing Sheets

(51) Int. Cl.
*G06F 9/50* (2006.01)
*G06F 17/30* (2006.01)
*G06F 9/54* (2006.01)
*G06F 9/445* (2006.01)
*H04W 4/18* (2009.01)

(52) U.S. Cl.
CPC .............. *G06F 2009/45562* (2013.01); *G06F 2009/45575* (2013.01); *H04W 4/18* (2013.01)

(56) References Cited

U.S. PATENT DOCUMENTS

| | | | |
|---|---|---|---|
| 7,383,327 | B1 | 6/2008 | Tormasov et al. |
| 7,949,999 | B1 * | 5/2011 | Willeford ................... G06F 8/67 717/101 |
| 8,458,419 | B2 | 6/2013 | Basler et al. |
| 2004/0143605 | A1 | 7/2004 | Jupin et al. |
| 2005/0206630 | A1 | 9/2005 | MacLaurin |
| 2007/0226370 | A1 * | 9/2007 | Banks ...................... H04L 12/66 709/246 |
| 2007/0234195 | A1 | 10/2007 | Wells |
| 2008/0155223 | A1 | 6/2008 | Hiltgen et al. |
| 2008/0320050 | A1 | 12/2008 | Chan |
| 2009/0007106 | A1 | 1/2009 | Araujo, Jr. et al. |
| 2010/0049929 | A1 | 2/2010 | Nagarkar et al. |
| 2010/0049930 | A1 | 2/2010 | Pershin et al. |
| 2011/0231696 | A1 | 9/2011 | Ji et al. |
| 2012/0059929 | A1 | 3/2012 | Ramanathaiah et al. |
| 2012/0079221 | A1 | 3/2012 | Sivasubramanian et al. |
| 2012/0131480 | A1 | 5/2012 | Kalmbach et al. |
| 2012/0324183 | A1 | 12/2012 | Chiruvolu et al. |
| 2013/0014103 | A1 | 1/2013 | Reuther et al. |
| 2013/0047154 | A1 | 2/2013 | Mehta |
| 2013/0063448 | A1 | 3/2013 | Fields, Jr. et al. |
| 2013/0159379 | A1 * | 6/2013 | Boskovic ................ G06F 9/541 709/203 |
| 2013/0185716 | A1 | 7/2013 | Yin et al. |
| 2013/0191509 | A1 * | 7/2013 | Loughry ................ G06F 9/541 709/219 |
| 2013/0212460 | A1 | 8/2013 | Balasubramanian |
| 2013/0262390 | A1 | 10/2013 | Kumarasamy et al. |
| 2013/0262393 | A1 | 10/2013 | Mrak et al. |
| 2014/0280028 | A1 | 9/2014 | Ding et al. |
| 2014/0281692 | A1 | 9/2014 | Paleologu et al. |

OTHER PUBLICATIONS

"VMware vFabric Data Director API Programming Guide", vFabric Data Director, 2012, Version 2.0, VMware, Inc. Also available at <URL: http://pubs.vmware.com/datadirector-20/topic/com.vmware.ICbase/PDF/vfabric-data-director-20-api_programming-guide.pdf>.

"VMware vFabric Data Director-Database as a Service in Your Cloud", Datasheet, 2012, VMware, Inc. Also available at <URL: https://www.vmware.com/files/pdf/vfabric/VMware-vFabric-Data-Director-Datasheet.pdf>.

"VMware vFabric Data Director Administrator and User Guide", vFabric Data Director, 2012, Version 2.7, VMware, Inc. Also available at <URL: http://pubs.vmware.com/datadirector-27/topic/com.vmware.ICbase/PDF/vfabric-data-director-27-administration-guide.pdf>.

"VMware vSphere VMFS—Technical Overview and Best Practices", vSphere, 2012, Version 3.0, VMware, Inc.

* cited by examiner

SERVICE REQUEST PROCESSING

CROSS-REFERENCE TO RELATED APPLICATION

The present application claims the benefit of U.S. Provisional Application No. 61/823,914 filed May 16, 2013, and is related in subject matter to U.S. patent application Ser. Nos. 14/275,904 and 14/279,684, all three of which are incorporated herein by reference.

BACKGROUND

Unless otherwise indicated herein, the approaches described in this section are not admitted to be prior art by inclusion in this section.

As a service supported by a server evolves or changes, multiple versions of the service may be created. For example, a newer version of the service may be introduced to provide additional features or replace existing ones. Instead of necessitating all clients to adopt the newer version, a server may support backward compatibility to provide clients with continued access to older versions of the service. Such continued support for older versions reduces implementation changes at the clients, but is generally more difficult for the service provider to implement.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

It is generally expensive and complicated to maintain multiple versions (e.g., version 1 and newer version 2) of a service. Conventionally, when a request associated with version 1 of the service is received, the request is directed to the service implementation for version 1 for processing. Similarly, when a request associated with version 2 is received, the service implementation for version 2 is used, and so on.

Throughout the present disclosure, the term "service" refers generally to functionality that can be invoked by the client device via the server. An "implementation" of the service may include any suitable method, function, routine, operation, class, and task, etc., to provide the service. The implementation may include software, hardware, or a combination of hardware and software suitable, etc. Further, "requests" and "responses" may take any suitable form. For example, a request may be an application programming interface (API) call that includes a header with version information and where applicable, a body specifying at least one parameter. A response may indicate whether the request is successful or otherwise. Similar to a request, a response may include a header and where applicable, a body.

According to one embodiment of the present disclosure, a request for service is converted from a first version (e.g., version 1) to a second version (e.g., newer version 2) prior its processing. For example, when a request associated with version 1 is received, the request is converted to version 2 before version 2 of the request is processed using the service implementation for version 2 (i.e. instead of version 1). As such, a server may maintain one version of the service implementation to support backward compatibility for version 1. Depending on the application, different servers might implement different versions, such as version 2.7 for server A and version 2.8 for server although a version 2.9 of the product is available elsewhere.

Figure 1:
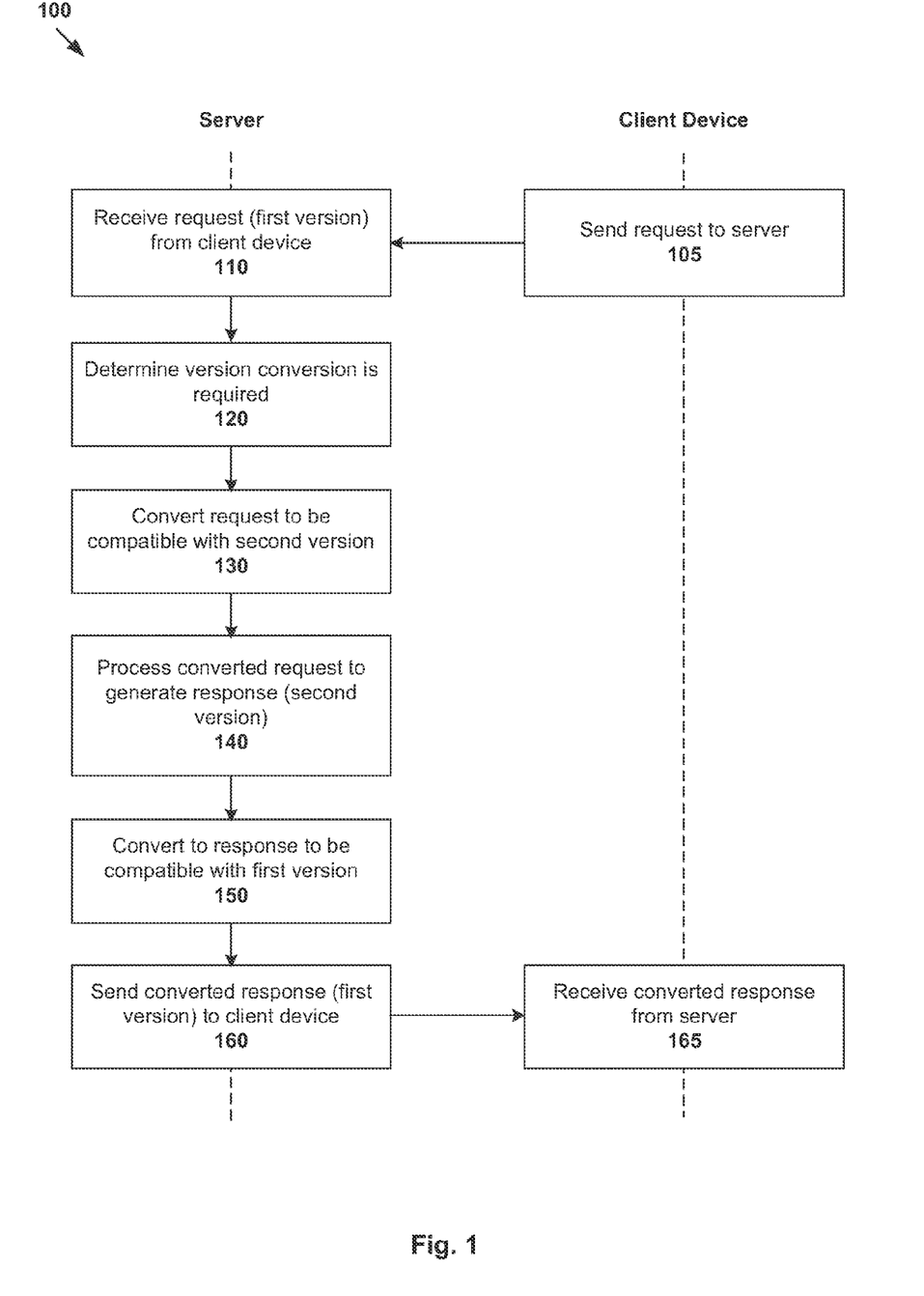
FIG. 1 is a flowchart illustrating an example process for service request processing.

FIG. 1 is a flowchart of an example process 100 for a server to perform service request processing. Process 100 may include one or more operations, functions, or actions illustrated by one or more blocks, such as blocks 110 to 160 performed by the server and blocks 105 and 165 by a client device. The various blocks may be combined into fewer blocks, divided into additional blocks, and/or eliminated based upon the desired implementation.

Referring to the server in FIG. 1: at block 110, the server receives, from the client device a request associated with a first version (e.g., version 1) of a service accessible via the server. At blocks 120 and 130, in response to determination that version conversion is required (e.g., when version 1 is not the latest version), the request is converted to be compatible with a second version (e.g., newer version 2) of the service. At block 140 in FIG. 1, the server then processes the converted request (e.g., by invoking an implementation of the service supported by a backend system) to generate a response associated with the second version (e.g., newer version 2). At blocks 150 and 160, the server converts the response to be compatible with the first version (e.g., version 1), and sends the converted response to the client device.

Referring to the client device: at block 105, the client device sends the request of first version to the server. At block 165, the client device receives the converted response of first version.

According to example process 100, version conversion of requests and responses facilitates a more efficient deployment of new service versions. For example, when a service version is deployed, it is relatively easier to convert requests from one version to another, when compared to updating and testing the underlying service implementation to support different versions. As such, the costs associated with supporting backward compatibility may be reduced, such as storage needs, maintenance costs and testing requirements.

The "version conversion" in example process 100 may include any suitable modification, such as modifying a header or a body, or both, of the requests and responses. This conversion process allows the underlying service implementation that processes the requests to focus on service provision, rather than having to consider different versions of requests and responses and select the appropriate version of service implementation.

Computing Environment

Figure 2:
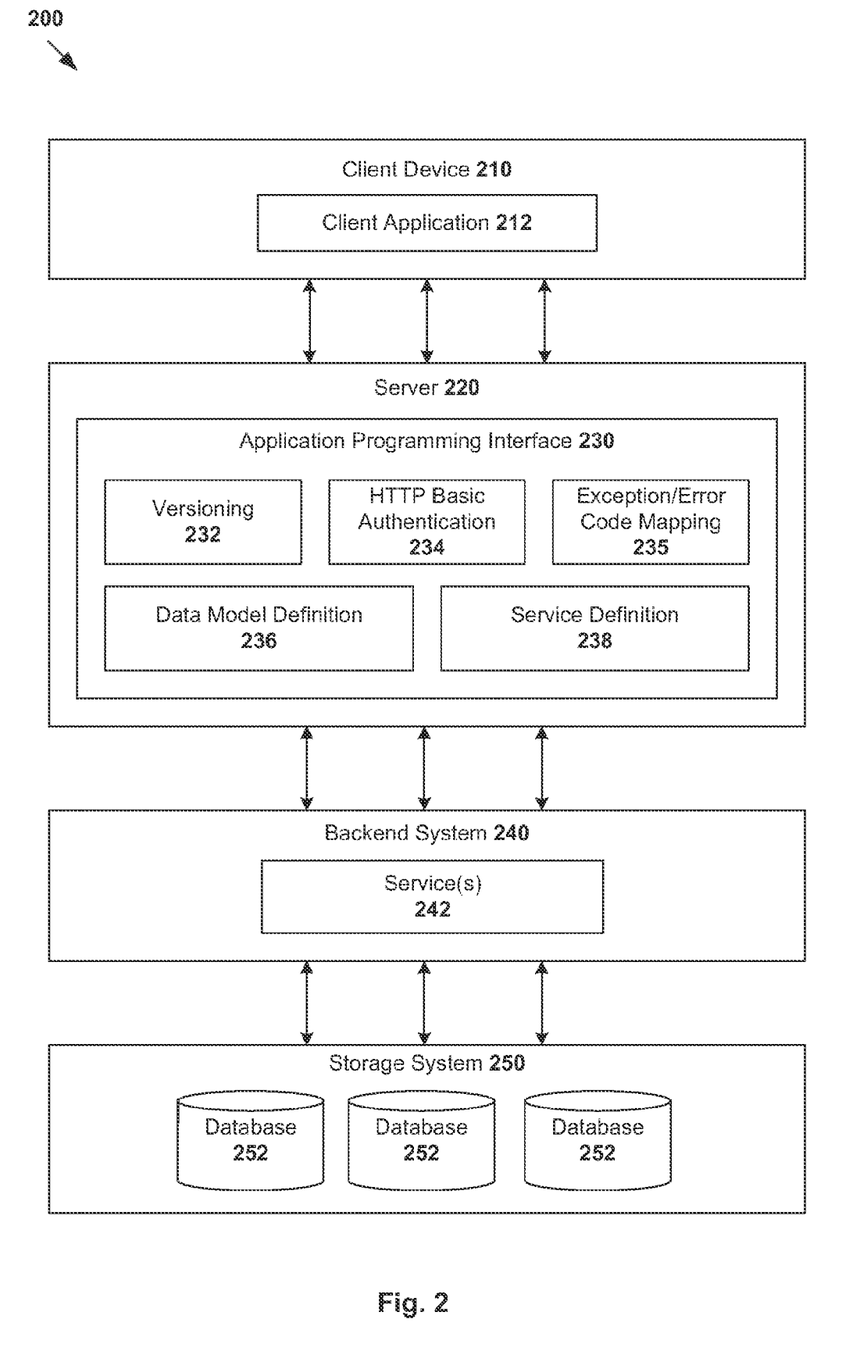
FIG. 2 is a schematic diagram illustrating an example computing environment in which service request processing may be implemented.

FIG. 2 is a schematic diagram illustrating example computing environment 200 in which service request processing may be implemented. It should be understood that computing environment 200 may include additional or alternative components, and may have a different configuration.

Computing environment 200 includes client device 210 (one shown for simplicity) that interacts with server 220 to access an implementation of service 242 supported by backend system 240. Although server 220 and backend system 240 are illustrated as separate devices in FIG. 1, it should be understood that they may be implemented on the same physical machine (e.g., server, host), or different ones. Server 220 and backend system 240 may also be implemented using virtual machines in a virtualized computing environment. Client device 210 may communicate with server 220 using any communications network, such as wide area network, local area network, etc. Client device 210 may be any suitable computing device, such as a mobile device, desktop computer, tablet computer, etc.

API 230 allows client device 210 to access service 242 using any suitable client-server communication protocol that provides a set of functions and definitions (e.g., routines, classes, methods, call types, etc.) to access service 242. The protocol abstracts the underlying service implementation from client device 210. In this case, client application 212 at client device 210 may access service 242 by sending, to API 230, a service request in the form of an "API call" to invoke the relevant function that implements service 242.

Any suitable protocol may be used in computing environment 200, such as representational state transfer (REST) API, simple object access protocol (SOAP), etc. REST generally describes an architectural style characteristic of programs that rely on the inherent properties of hypermedia to create and modify the state of an object whose serialized representation is accessible as a uniform resource identifier (URI). Using service requests in the form of REST API calls, client device 210 communicate with API 230 over hyperText transport protocol (HTTP") to exchange representations of objects in any suitable format, such as Javascript object notation (JSON) objects and extensible markup language (XML) elements.

Backend system 240 has access to storage system 250 that includes databases 252 for storing data that is made available to client device 210 through API calls supported by API 230. Backend system 240 and storage system 250 may be running on the same machine (e.g., server, host, etc.), or different machines. The data in databases 252 may relate to objects identifiable by API calls received from client device 210. For example, in a database application, the "objects" may represent databases; database groups; organizations; users; roles; and resource bundles that may include CPU/memory/storage resources, etc. Also, API calls may be made by client device 210 to, for example, create, retrieve, update or delete the objects.

In the example in FIG. 2, API 230 further includes versioning module 232 to facilitate processing of service requests and version conversion; HTTP basic authentication module 234 for authentication (e.g., whether client device 210 is authorized to access certain data in database 252 based on request headers, etc.); exception/error code mapping module 235 for exception/error handling; data model definition module 236 that defines a list of fields and their types for API calls (e.g., as an XML Schema, etc.); and service definition module 238 that provides a standard framework for service access (e.g., REST service definition using Jersey, etc.).

As will be explained using FIG. 3 and FIG. 4, server 220 is to receive requests for service 242 from client device 210 and perform version conversion according to example process 100 in FIG. 1.

Version Conversion

Figure 3:
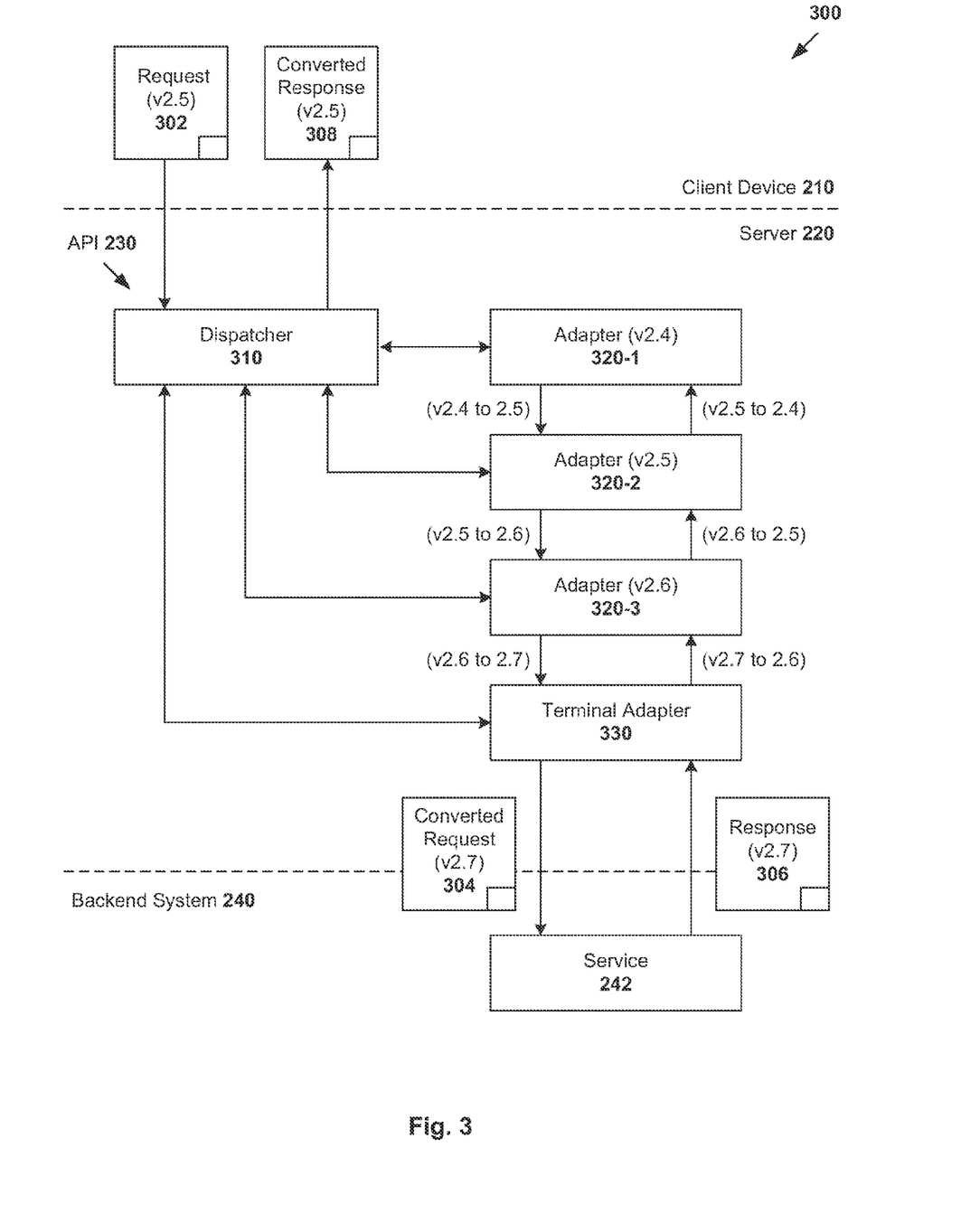
FIG. 3 is a schematic diagram illustrating an application programming interface (API) of a server for implementing the example process in FIG. 1.

FIG. 3 shows a schematic diagram illustrating API 230 of server 220 for service request processing in example computing environment 200 in FIG. 2. Although an example is shown, API 230 and backend system 240 may include additional or alternative components, and may have a different configuration.

To facilitate version conversion, API 230 (e.g., versioning module 232) may further include dispatcher 310 to receive and distribute requests for version conversion; adapters 320-1 to 320-3 to perform version conversion of requests and responses; and terminal adapter 330 to convert requests and responses into suitable format used by backend system 240 and client device 210. The version conversion by adapters 320-1 to 320-3 may involve modification of a header or body, or both, of the requests and responses, such as to change the version information in the header and modify a parameter in the body, etc. Although adapters 320-1 to 320-3 and terminal adapters 330 are shown as distinct components, they may be combined into a single adapter to modify requests and responses from one version to another. Similarly, dispatcher 310 may be combined with adapters 320-1 to 320-3 and terminal adapters 330 as a single component.

In the example in FIG. 3, dispatcher 310 receives request 302 of version 2.5 (i.e. "first version") from client device 210. Version 2.5 is older than version 2.7 (i.e. "second version"), which is the latest version of service 242 implemented by backend system 240. To support backward compatibility for older versions 2.4 to 2.6, adapters 320-1 to 320-3 convert request of version 2.5 (see 302) to converted request of version 2.7 (see 304). Terminal adapter 330 also modifies converted request of version 2.7 (see 304) into a format that can be processed by backend system 240. Processing of converted request of version 2.7 (see 304) generates response of version 2.7 (see 306), which is converted by adapters 320-1 to 320-3 and terminal adapter 330 to converted response of version 2.5 (see 308).

It will be appreciated that version conversion of requests is from an older version used by client device 210 to the newest version implemented by backend system 240. Adapters 320-1 to 320-3 form a cascading chain that successively modifies requests from one version to another, i.e. from the first version (e.g., version 2.5) to an intermediate version (e.g., version 2.6), and then to the second version (e.g., version 2.7). On the other hand, version conversion of responses is from the newest version implemented by backend system 240 to the older version used by client device 210. The cascading chain may be used to successively modify responses from the second version (e.g., version 2.7) to an intermediate version (e.g., version 2.6), and then to the first version (e.g., version 2.5).

The use of cascading chain 320-1 to 320-3 has many benefits. For example, disabling an older version (e.g., version 2.4) only requires removal of the corresponding adapter (e.g., 320-1). Similarly, adding a newer version (e.g., version 2.8) only requires adding a new adapter (e.g., for conversion from version 2.7 to 2.8). Further, using this approach, it is not necessary for server 220 to send version information of request 302 to backend system 240 in order for backend system 240 to select the appropriate implementation of service 242. Instead, service versioning is handled by server 220 and abstracted from backend system 240.

The examples in FIG. 3 will also be discussed with reference to FIG. 4, which is a flowchart illustrating example process 400 by API 230 for service request processing. Example process 400 may include one or more operations, functions, or actions illustrated by one or more blocks, such as blocks 410 to 460. The various blocks may be combined into fewer blocks, divided into additional blocks, and/or eliminated based upon the desired implementation.

Figure 4:
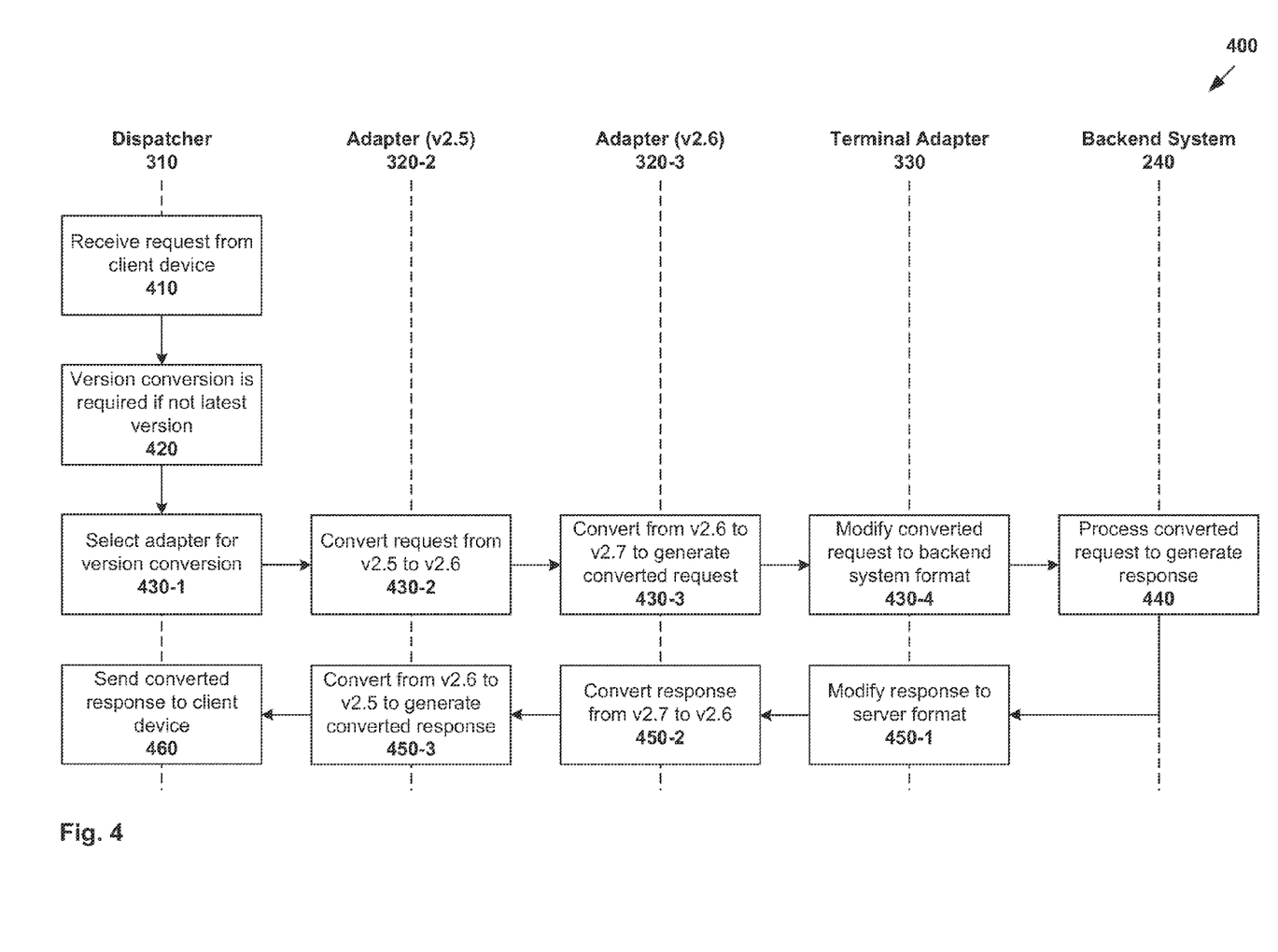
FIG. 4 is a flowchart illustrating an example process by the API in FIG. 3 for service request processing.

At block 410 in FIG. 4 (related to 110 in FIG. 1), dispatcher 310 receives request 302 from client device 210. For example, in a RESTful workflow (i.e. based on REST API), request 302 may be a HTTP request to API 230, such as GET, PUT, POST or DELETE, etc. GET request may be used for retrieving the representation of an object; PUT for modifying an existing object; POST for creating a new object; and DELETE for deleting an existing object. The target of this HTTP request is generally the path of API 230.

Table 1 shows an example request 302, which is a POST request issued by client device 210 for creating a new database 252 in storage system 250 in FIG. 2. Request 302 includes "Accept" header (line 2), "Content-Type" header (line 3). A request body (lines 4 to 14) specifies parameters for the API call, such as group ID (line 5), group settings (lines 6 to 8), names (lines 9 to 10), administrator configuration (lines 11 to 14), resource settings (lines 15 to 17) and base database template (line 18) of the new database.

TABLE 1

Request (version 2.5)

```
 1  POST https://example.aurora.com/datadirector/api/databases
 2  Accept: application/vnd.vmware.vfdd-v2.5+json
 3  Content-Type: application/vnd.vmware.vfdd-v2.5+json
 4  {
 5    "dbgroupId": 93,
 6    "parameterGroupSetting": {
 7      "parameterGroupId": 9
 8    },
 9    "name": "Aurora",
10    "dbName": "Aurora",
11    "administratorConfig": {
12      "ownerName": "Aurora",
13      "ownerPassword": "Aurora"
14    },
15    "resourceSetting": {
16      "resourceTemplateId": 88
17    },
18    "baseDbTemplateId":5
19  }
```

At block 420 in FIG. 4 (related to 120 in FIG. 1), dispatcher 310 determines whether version conversion of request 302 is required. For example, the determination may include obtaining the version information (i.e. version 2.5) of request 302 and comparing it with the latest version (i.e. version 2.7). In the example in Table 1, API 230 supports versioning through HTTP Accept and/or Content-Type headers. For example, if version 2.5 API is used, both headers include "v2.5" (see lines 2 and 3 in Table 1). If the version (i.e. version 2.5) is not the latest version (i.e. version 2.7) supported by backend system 240, version conversion from version 2.5 to version 2.7 may be determined as required to allow backend system 240 to handle request 302.

At blocks 430-1 to 430-4 (related to 130 in FIG. 1), version conversion is performed in a cascading manner using adapters 320-1 to 320-3. To start the conversion process at block 430-1, dispatcher 310 distributes request 302 to an adapter selected from the chain based on version information (i.e. version 2.5) of request 302.

At block 430-2, adapter 320-2 associated with version 2.5 is selected to start the conversion process of request 302 from version 2.5 to 2.6. Although not shown, the selection may be made by making a function call (e.g., to an adapter utility module) to determine the relevant adapter 320-2 based on version information of request 302. The output of adapter 320-2 (i.e. request of version 2.6) is provided to adapter 330-3, which continues the conversion process from version 2.6 to 2.7 at block 430-3.

At block 430-4, terminal adapter 330 completes the conversion process to generate converted request 304 of version 2.7 in a format readable by backend system. For example, terminal adapter 330 may map the request to parameters of backend service implementation (e.g., via API provided by backend system 240). In the example in Table 1, parameter "dbgroupId" (line 5) may be mapped to a corresponding parameter (e.g., "database_groupid") used by backend system 240.

The conversion by terminal adapter 330 may include modifying a header and/or body of the request 302, such as to add, remove or change a parameter. Table 2 shows an example converted request 304 of version 2.7, which is the same as request 302 except lines 2 to 3 and new lines 20 to 26. In particular, after the conversion at blocks 430-1 to 430-4 in FIG. 4, the version information in Accept (line 2) and Content-Type (line 3) headers changes from "v2.5" to "v2.7". Also, the 2.5 version request in Table 1 does not contain a disk layout configuration, while a 2.7 version request does. At lines 20 to 26, terminal adapter 330 adds default values for new parameters relating to "diskMapping".

TABLE 2

Converted request (version 2.7)

```
 1  POST https://example.aurora.com/datadirector/api/databases
 2  Accept: application/vnd.vmware.vfdd-v2.7+json
 3  Content-Type: application/vnd.vmware.vfdd-v2.7+json
 4  {
 5    "dbgroupId": 93,
 6    "parameterGroupSetting": {
 7      "parameterGroupId": 9
 8    },
 9    "name": "Aurora",
10    "dbName": "Aurora",
11    "administratorConfig": {
12      "ownerName": "Aurora",
13      "ownerPassword": "Aurora"
14    },
15    "resourceSetting": {
16      "resourceTemplateId": 88
17    },
18    "baseDbTemplateId":5
19    }
20    "diskMapping":{
21      "instance":[{
22        "diskName":"data1",
23        "diskSizeGb":15,
24        "datastoreRefId":"null:Datastore:datastore-3803"
25      }]
26    }
27  }
```

At block 440 in FIG. 4 (related to 140 in FIG. 1), server 220 processes converted request 304 to generate response 306, such as by forwarding it to backend system 240 and invoking the relevant implementation for service 242. For example, server 220 may communicate with backend system 240 via a backend service API. This results in response 306 of version 2.7, which needs to be converted to version 2.5 used by client device 210.

At blocks 450-1 to 450-3 in FIG. 4 (related to 150 in FIG. 1), response 306 of version 2.7 is converted to be compatible with the first version (e.g., version 2.5). In particular, response 306 is converted by terminal adapter 330 to a format readable by server 220, adapter 320-3 from version 2.7 to 2.6 and finally adapter 320-2 from version 2.6 to 2.5. The conversion may include modifying a header and/or body of the request 302, such as to add, remove or change a parameter. Terminal adapter 330 also helps to isolate the chain of adapters 320-1 to 320-3 from backend system 240. For example, if an adapter for a newer version 2.8 is added to the chain, it is not necessary to update the interface between terminal adapter 330 and backend system 240 to access backend service 242.

At block 460 in FIG. 4 (related to 160 in FIG. 1), converted response 308 of first version (e.g., version 2.5) is sent by dispatcher 310 to client device 210.

Table 3 and Table 4 show example response 306 of version 2.7 and converted response 308 of version 2.5, respectively. Response 306 and converted response 308 are the same except for the version information in the Content-Type header (line 3), which is "2.7" in Table 3 and "2.5" in Table 4. Both also include an HTTP status code, such as "202 Accepted" (line 1) that indicates the request is valid and a task was created to handle it. The "Location" header (line 2) accompanying the "202 Accepted" status code specifies the URL of the created task and its task ID (i.e. ID="6").

TABLE 3

| Response (version 2.7) |
| --- |
| 1  202 Accepted |
| 2  Location: https://example.aurora.com/datadirector/api/task/6 |
| 3  Content-Type: application/vnd.vmware.vfdd-v2.7+json |
| 4  Content-Length: 0 |

TABLE 4

| Converted response (version 2.5) |
| --- |
| 1  202 Accepted |
| 2  Location: https://example.aurora.com/datadirector/api/task/6 |
| 3  Content-Type: application/vnd.vmware.vfdd-v2.5+json |
| 4  Content-Length: 0 |

Although a database creation request is used as an example using FIG. 3 and FIG. 4, other types of request may be processed. Other examples include POST request for creating an organization or database group; DELETE request for deleting a database with ID=25 (e.g., "DELETE https://example.aurora.com/datadirector/database/25"); and PUT request for reconfiguring a database with ID=25 (e.g., "PUT https://example.aurora.com/datadirector/database/25"), etc.

Other examples of responses include "201 Created" (i.e. request is valid and request object created); "204 No Content" (i.e. request is valid and completed, and response does not include a body); "401 Unauthorized" (i.e. an authorization header was expected but not found); and "403 Forbidden" (i.e. the requesting user does not have adequate privileges to access an object specified in the request), etc. Further, although JSON representation is used in Table 1 to Table 4, any other suitable representation may be used, such as XML, etc.

In other examples, response 306 and converted response 308 may include a body with "Content-Length" greater than zero. For example, when the request is a GET request to retrieve a representation of the database, the conversion at blocks 450-1 to 450-3 may further include modifying the body of the corresponding response, such as to modify parameters of the retrieved representation.

Virtualized Computing Environment

Figure 5:
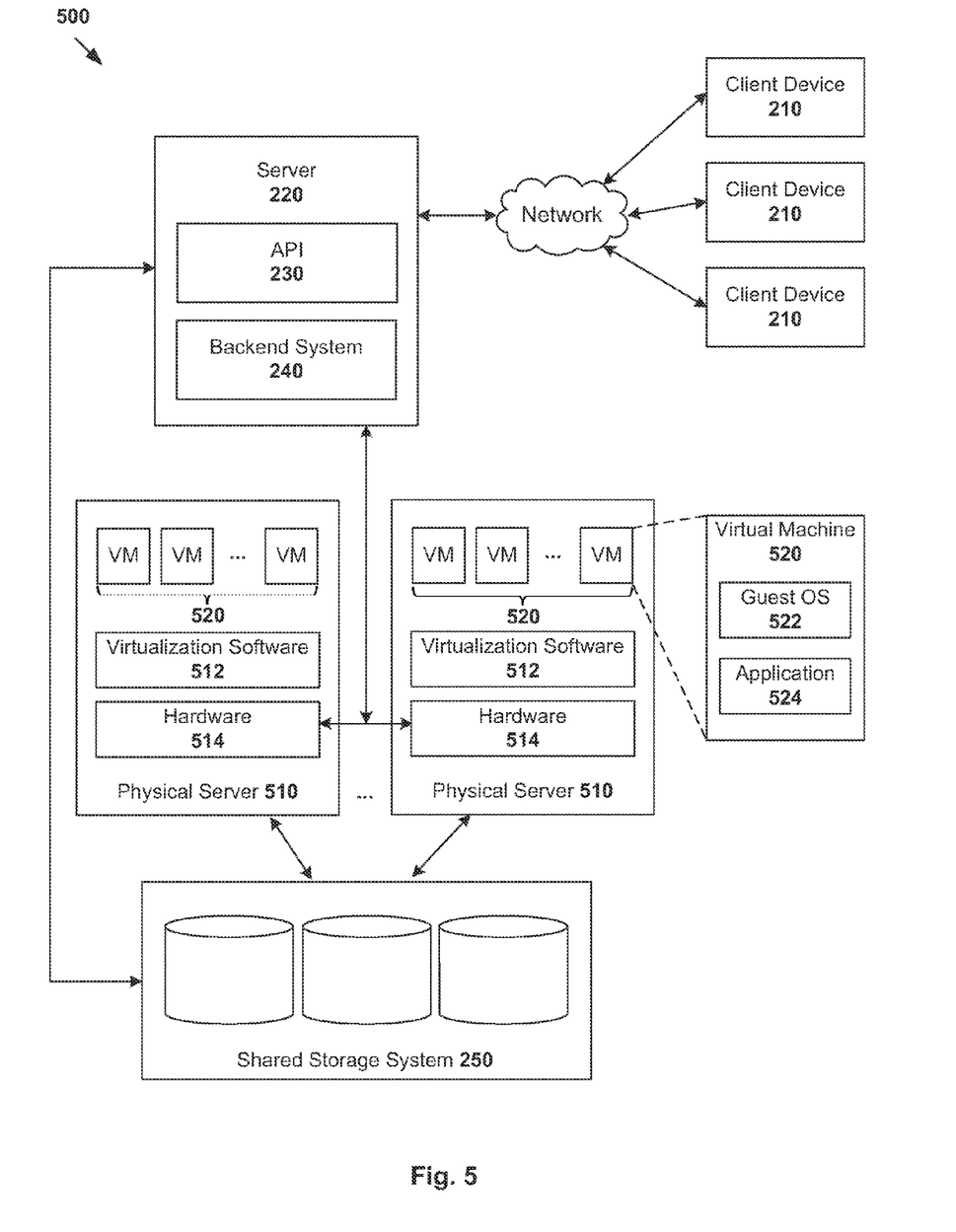
FIG. 5 is a schematic diagram illustrating an example virtualized computing environment for service request processing.

FIG. 5 is a schematic diagram illustrating example virtualized computing environment 500 for service request processing. Although one example is shown, it should be understood that there may be additional or alternative components, and a different configuration.

Similar to the example in FIG. 2, server 220 is accessible by client devices 210 to access services 242 provided by backend system 240, which may be part of server 220 in this example. Services 242 may be accessed by client device 210 via API 230 supported by server 220. According to the examples in FIG. 1 to FIG. 4, API 230 performs version conversion of incoming requests such that they are compatible with the corresponding service implementation by backend system 240. The responses are also converted so that they are compatible with client device 210.

Server 220 is connected to physical servers 510 (also known as "hosts") that each execute virtualization software 512 (e.g., hypervisor) and include suitable hardware 514 to support multiple virtual machines 520. Virtualization software 512 also maintains a mapping between virtual resources and physical resources, such as CPU resources (e.g., processors), memory resources (e.g., random access memory), network resources (e.g., access networks) and storage resources (e.g., storage using databases 252). Each virtual machine 520 may support guest operating system 522 and at least one application 524 (e.g., database instance).

Services 242 supported by backend system 240 and accessible via API 230 may include the provisioning, management and maintenance of storage resources (e.g., databases 252), CPU resources, memory resources, network resources, virtual machines 520, etc. The services 242 may also be related to the provisioning, management and maintenance of "objects" stored in storage resources and/or memory resources, etc.

Unified Virtualization Platform

Figure 6:
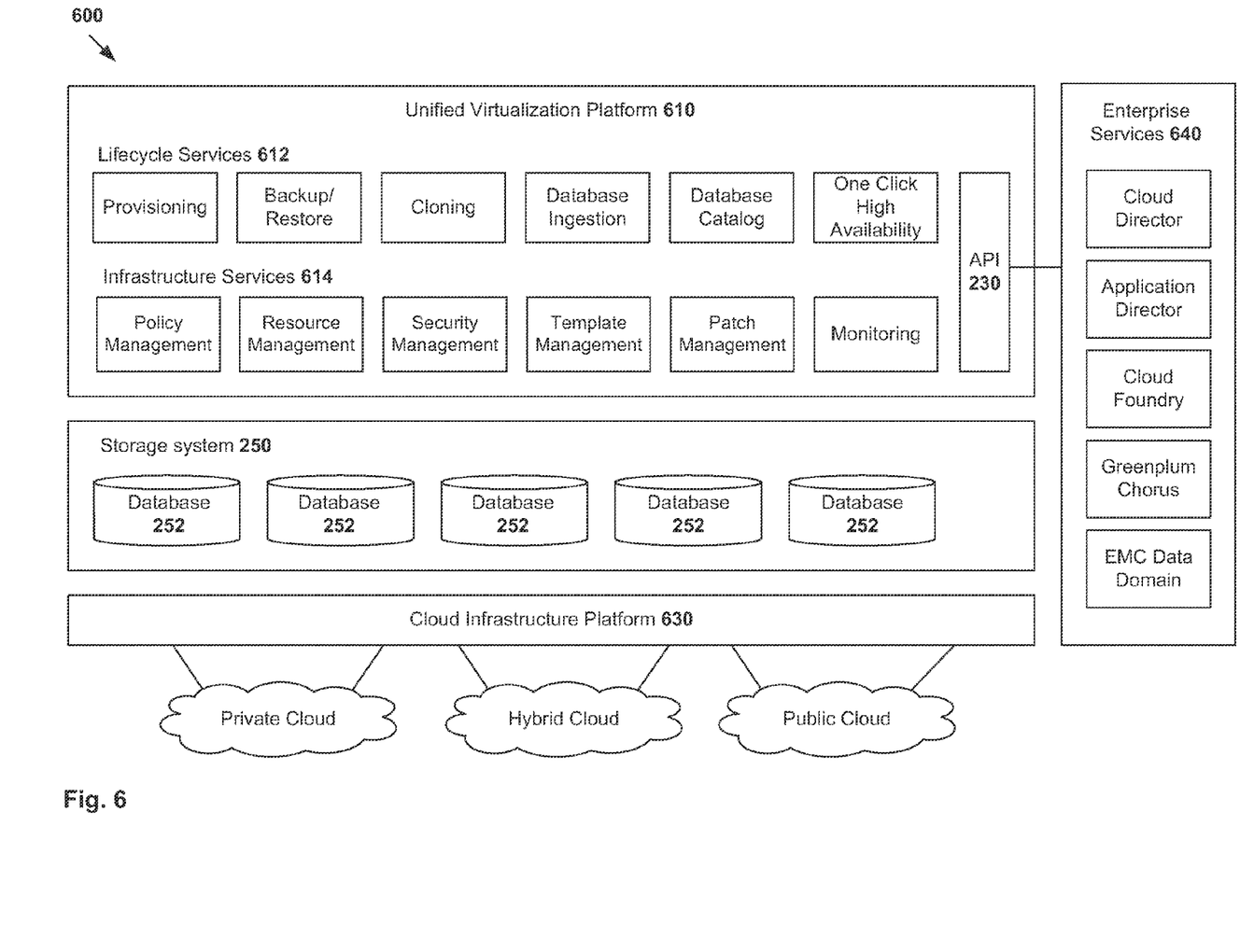
FIG. 6 is schematic diagram illustrating an example unified virtualization platform for service request processing.

FIG. 6 is a schematic diagram illustrating an example unified virtualization platform 610 for service request processing. Although one example is shown, it should be understood that there may be additional or alternative components, and a different configuration.

In the example in FIG. 6, server 220 in FIG. 2 may be unified virtualization platform 610 (also known as "Data Director") that supports database-aware virtualization and provides database as a service (DBaaS) to application developers. Virtualization of databases helps address the issue of growing database infrastructure and excessive operational cost of databases.

Through platform 610, heterogeneous databases 620 may be managed, such as databases using technologies such as vPostgres, Oracle, SQL Server, Hadoop cluster, etc. Unified virtualization platform 610 is also connected to cloud infrastructure platform 640 that provides access to resources residing on different cloud environments (e.g., private cloud, hybrid cloud and public cloud).

Unified virtualization platform 610 may offer self-service database lifecycle management services 612 for databases 252 in storage system 250. Database lifecycle management services 612 may include provisioning (e.g., to process the database provisioning request in Table 1); backup or restore; database cloning; database ingestion; database catalog; and one-click high availability (HA), etc. Such self-service services enables application developers to create new databases, manage schemas, configure backups, perform restores, clone databases for testing and development, scale up database sizes and decommission databases.

Unified virtualization platform 610 may further provide infrastructure services 614, such as policy management (e.g., policy-based data placement); resource management (e.g., allocating resources to database groups within an organization); security management (e.g., security policies for access control); template management (e.g., templates for database configuration and backup); patch management (e.g., when new versions are available) and monitoring services, etc.

Database lifecycle management services 612 and infrastructure services 614 represent services provided by backend system 240 in FIG. 2. Through an integration gateway in the form of API 230, these services may be accessed by other applications, such as those provided by a system for provisioning of software-defined datacentre services (e.g., Cloud Director), application provisioning system (e.g., Application Director), cloud computing platform (e.g., Cloud Foundry), analytic productivity platform (e.g., Greenplum Chorus), and deduplication storage system (e.g., EMC Data Domain).

Computer System

Figure 7:
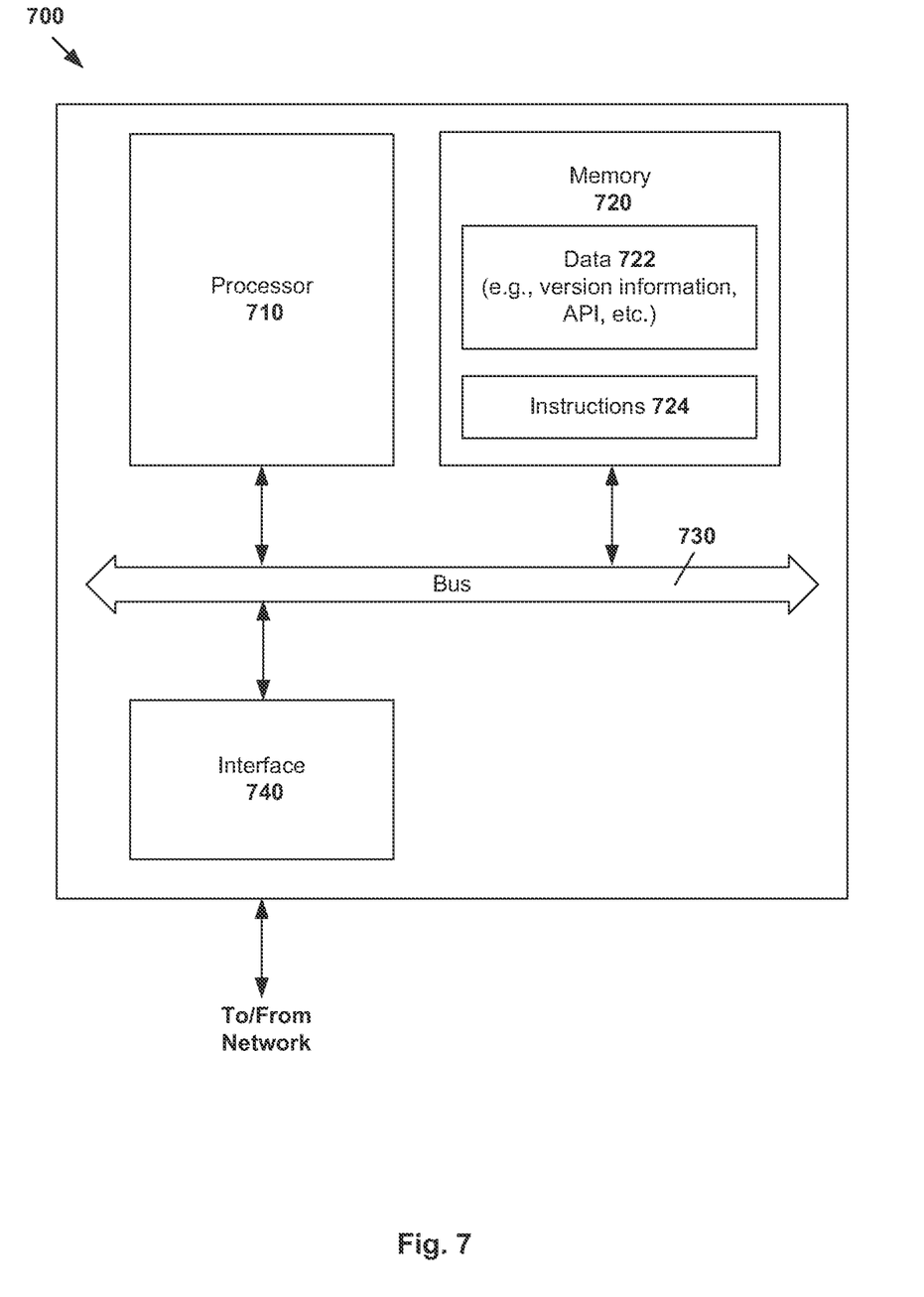
FIG. 7 is a schematic diagram illustrating a computer system for service request processing.

The above examples can be implemented by hardware, software or firmware or a combination thereof. FIG. 7 is a schematic diagram of an example computer system 700 for service request processing. Example computer system 700 is capable of acting as server 220 described herein.

Example computer system 700 may include processor 710, memory 720, network interface device 740, and bus 730 that facilitates communication among these illustrated components and other components. Processor 710 is to perform processes described herein with reference to FIG. 1 to FIG. 6. Memory 720 may store relevant information 722 to perform service request processing, such as version information of requests and/or responses, etc. Memory 720 may further store machine-readable instructions 724 executable by processor 710 to cause processor 710 to perform processes described herein with reference to FIG. 1 to FIG. 6.

The methods, processes and components described herein may be implemented by hardware (including hardware logic circuitry), software or firmware or a combination thereof. The term 'processor' is to be interpreted broadly to include a processing unit, ASIC, logic unit, or programmable gate array etc. The techniques introduced above may be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others.

Software and/or firmware to implement the techniques introduced here may be stored on a non-transitory machine-readable storage medium and may be executed by one or more general-purpose or special-purpose programmable microprocessors. A "machine-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). For example, a machine-accessible accessible storage medium includes recordable/non recordable media (e.g., read-only memory (ROM), random access memory (RAM), magnetic disk storage media, optical storage media, flash memory devices, etc.)

The figures are only illustrations of an example, wherein the units, components or processes shown in the figures are not necessarily essential for implementing the present disclosure. Those skilled in the art will understand that the units in the device in the example can be arranged in the device in the examples as described, or can be alternatively located in one or more devices different from that in the examples. The units in the examples described can be combined into one module or further divided into a plurality of sub-units.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

We claim:

1. A method for a server to perform service request processing, the method comprising:
   receiving, from a client device, a request associated with a first version of a service, the service being implemented by a backend system and accessible via the server, wherein a header or body of the request includes version information that identifies the first version;
   in response to determination that version conversion from the first version to a second version of the service is required,
   converting the request to be compatible with the second version of the service by mapping a parameter in the body of the request to a corresponding parameter used by the backend system, and modifying the header or body of the request to update the version information to identify the second version instead of the first version according to the mapping;
   processing the converted request to generate a response associated with the second version, wherein a header or body of the response includes version information that identifies the second version;
   converting the response to be compatible with the first version of the service by modifying the header or body of the response to update the version information to identify the first version instead of the second version; and
   sending, to the client device, the converted response that is compatible with the first version.

2. The method of claim 1, wherein converting the request to be compatible with the second version of the service comprises using a chain of adapters supported by the server to successively convert from the first version to an intermediate version and from the intermediate version to the second version.

3. The method of claim 2, wherein converting the request to be compatible with the second version of the service further comprises using a dispatcher supported by the server to select, from the chain of adapters, an adapter associated with the first version to start the conversion.

4. The method of claim 2, wherein converting the request to be compatible with the second version of the service further comprises using a terminal adapter supported by the server to modify the converted request into a format readable by a backend system implementing the service.

5. The method of claim 1, wherein converting the response to be compatible with the first version of the service comprises using a chain of adapters to successively convert the response from the second version to an intermediate version and from the intermediate version to the first version.

6. The method of claim 1, wherein converting the request to be compatible with the second version of the service, or the response to be compatible with the first version of the service, comprises modifying the header or a body, or both, of the request or response to add, remove or change a parameter.

7. The method of claim 1, wherein determination that version conversion comprises retrieving the first version from a header of the request and comparing the first version with the second version.

8. The method of claim 1, wherein processing the converted request comprises invoking an implementation of the service supported by a backend system.

9. The method of claim 1, wherein the request is a representational state transfer (REST) application programming interface (API) call to the server to retrieve, modify, create or remove a representation of an object stored in a database.

10. The method of claim 9, wherein the request or converted response, or both, includes the representation of the object in one of the following format: extensible markup language (XML) and Javascript object notation (JSON).

11. A non-transitory computer-readable storage medium that includes a set of instructions which, in response to execution by a processor, causes the processor to perform service request processing, comprising:
receiving, from a client device, a request associated with a first version of a service, the service being implemented by a backend system and accessible via the server, wherein a header or body of the request includes version information that identifies the first version;
in response to determination that version conversion from the first version to a second version of the service is required,
converting the request to be compatible with the second version of the service by mapping a parameter in the body of the request to a corresponding parameter used by the backend system, and modifying the header or body of the request to update the version information to identify the second version instead of the first version according to the mapping;
processing the converted request to generate a response associated with the second version, wherein a header or body of the response includes version information that identifies the second version;
converting the response to be compatible with the first version of the service by modifying the header or body of the response to update the version information to identify the first version instead of the second version; and
sending, to the client device, the converted response that is compatible with the first version.

12. The non-transitory computer-readable storage medium of claim 11, wherein converting the request to be compatible with the second version of the service comprises using a chain of adapters supported by the server to successively convert from the first version to an intermediate version and from the intermediate version to the second version.

13. The non-transitory computer-readable storage medium of claim 12, wherein converting the request to be compatible with the second version of the service further comprises using a dispatcher supported by the server to select, from the chain, an adapter associated with the first version to start the conversion.

14. The non-transitory computer-readable storage medium of claim 12, wherein converting the request to be compatible with the second version of the service further comprises using a terminal adapter supported by the server to modify the converted request into a format readable by a backend system implementing the service.

15. The non-transitory computer-readable storage medium of claim 11, converting the response to be compatible with the first version of the service comprises using a chain of adapters to successively convert the response from the second version to an intermediate version and from the intermediate version to the first version.

16. The non-transitory computer-readable storage medium of claim 11, converting the request to be compatible with the second version of the service, or the response to be compatible with the first version of the service, comprises modifying the header or a body, or both, of the request or response to add, remove or change a parameter.

17. The non-transitory computer-readable storage medium of claim 11, wherein the request is a representational state transfer (REST) application programming interface (API) call to the server to retrieve, modify, create or remove a representation of an object stored in a database.

18. A computer system configured to process a service request, wherein the computer system comprises: a processor; and a non-transitory computer-readable storage medium having stored thereon instructions that, when executed by the processor, cause the processor to:
receive, from a client device, a request associated with a first version of a service, the service being implemented by a backend system and accessible via the computer system, wherein a header or body of the request includes version information that identifies the first version;
in response to determination that version conversion from the first version to a second version of the service is required,
convert the request to be compatible with the second version of the service by mapping a parameter in the body of the request to a corresponding parameter used by the backend system, and modifying the header or body of the request to update the version information to identify the second version instead of the first version according to the mapping;
process the converted request to generate a response associated with the second version, wherein a header or body of the response includes version information that identifies the second version;
convert the response to be compatible with the first version of the service by modifying the header or body of the response to update the version information to identify the first version instead of the second version; and
send, to the client device, the converted response that is compatible with the first version.

19. The computer system of claim 18, wherein the instructions for converting the request to be compatible with the second version of the service further cause the processor to implement one or more of the following:
- a chain of adapters to successively convert from the first version to an intermediate version and from the intermediate version to the second version;
- a dispatcher to select, from the chain, an adapter associated with the first version to start the conversion; and
- a terminal adapter supported by the computer system to modify the converted request into a format readable by a backend system implementing the service.

20. The computer system of claim 18, wherein the instructions for converting the response to be compatible with the first version of the service, when executed by the processor, further cause the processor to implement:
- a chain of adapters to successively convert the response from the second version to an intermediate version and from the intermediate version to the first version.

21. The computer system of claim 18, wherein the instructions for determining that version conversion is required further cause the processor to: retrieve the first version from a header of the request and comparing the first version with the second version.

22. The computer system of claim 18, wherein the instructions for processing the converted request further cause the processor to invoke an implementation of the service supported by a backend system.

23. The method of claim 1, wherein the parameter remains unmodified in the body of the request after the modifying the header or body of the request.

* * * * *